United States Patent
Hu et al.

(10) Patent No.: US 7,213,397 B2
(45) Date of Patent: May 8, 2007

(54) MECHANISM AND METHOD OF COMBINED FUEL REFORMER AND DOSING SYSTEM FOR EXHAUST AFTERTREATMENT AND ANTI-IDLE SOFC APU

(75) Inventors: Haoran Hu, Novi, MI (US); Subbaraya Radhamohan, Novi, MI (US); Karen Evelyn Bevan, Northville, MI (US); James Edward McCarthy, Jr., Canton, MI (US); Jiyang Yan, Troy, MI (US); Johannes W. Reuter, Ypsilanti, MI (US); Vishal Singh, Farmington Hills, MI (US)

(73) Assignee: Eaton Corporation, Cleveland, OH (US)

( * ) Notice: Subject to any disclaimer, the term of this patent is extended or adjusted under 35 U.S.C. 154(b) by 77 days.

(21) Appl. No.: 11/052,647

(22) Filed: Feb. 7, 2005

(65) Prior Publication Data
US 2006/0174608 A1 Aug. 10, 2006

(51) Int. Cl.
*F01N 3/00* (2006.01)
(52) U.S. Cl. ............................ 60/295; 60/274; 60/275; 60/286; 60/301
(58) Field of Classification Search .................. 60/274, 60/275, 286, 295, 301, 324
See application file for complete search history.

(56) References Cited

U.S. PATENT DOCUMENTS

| | | | |
|---|---|---|---|
| 6,653,817 B2 | 11/2003 | Tate, Jr. et al. | |
| 6,715,452 B1 * | 4/2004 | Taylor et al. | 123/3 |
| 6,843,054 B2 | 1/2005 | Taylor, III et al. | |
| 6,875,154 B2 * | 4/2005 | Mitsutani et al. | 477/107 |
| 7,007,766 B2 * | 3/2006 | Iwasaki | 180/65.2 |
| 7,021,048 B2 * | 4/2006 | Taylor et al. | 60/295 |
| 2002/0136935 A1 * | 9/2002 | Iwasaki | 429/7 |
| 2003/0115857 A1 | 6/2003 | Preis et al. | |
| 2003/0140622 A1 | 7/2003 | Taylor, III et al. | |
| 2003/0143445 A1 | 7/2003 | Daniel et al. | |
| 2004/0020191 A1 * | 2/2004 | Kramer | 60/286 |
| 2004/0146458 A1 * | 7/2004 | Weissman et al. | 423/651 |
| 2004/0162683 A1 | 8/2004 | Verbrugge et al. | |
| 2005/0022450 A1 | 2/2005 | Tan et al. | |

* cited by examiner

*Primary Examiner*—Thomas Denion
*Assistant Examiner*—Diem Tran
(74) *Attorney, Agent, or Firm*—Paul V. Keller, LLC

(57) ABSTRACT

The invention relates to a power generation system with a continuously operating fuel reformer. Preferably, the fuel reformer is either off, warming up, or operating with an essentially constant fueling rate. Some of the reformed fuel is intermittently used to regenerate a NOx trap that treats the exhaust of an internal combustion engine. Any reformed fuel not used for other purposes is supplied to a fuel cell. The fuel reformer does not shut down between NOx trap regeneration cycles except when the engine is also shut down. The invention substantially eliminates issues of reformer response time as they relate to NOx trap regeneration.

26 Claims, 2 Drawing Sheets

MECHANISM AND METHOD OF COMBINED FUEL REFORMER AND DOSING SYSTEM FOR EXHAUST AFTERTREATMENT AND ANTI-IDLE SOFC APU

FIELD OF THE INVENTION

The present invention relates to vehicle power generation systems and $NO_x$ emission controls.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting those regulations. $NO_x$ emissions can be controlled in conventional gasoline powered vehicles, which use stoichiometric fuel-air mixtures, by three-way catalysts. In the absence of oxygen, three-way catalysts reduce NOx by reaction with CO and unburned hydrocarbons. In diesel powered vehicles and lean-burn gasoline engines, however, the exhaust is too oxygen-rich for three-way catalysts to be effective.

Several solutions have been proposed for controlling NOx emissions in diesel-powered vehicles. One set of approaches focuses on the engine. NOx is generated primarily at high temperatures. By limiting the adiabatic flame temperature, through exhaust gas recirculation (EGR) for example, NOx production can be reduced. Lowering the adiabatic flame temperature to eliminate NOx production, however, causes engine efficiency to decrease and smoke to appear in the exhaust.

Another set of approaches remove NOx from the vehicle exhaust. These include the use of lean-burn $NO_x$ catalysts, $NO_x$ adsorber-catalysts, and selective catalytic reduction (SCR). Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

NOx adsorber-catalysts alternately adsorb NOx and catalytically reduce it. The adsorber can be taken offline during regeneration and a reducing atmosphere provided. The adsorbant is typically an alkaline earth oxide, such as $BaCO_3$ and the catalyst can be a precious metal, such as Ru.

SCR involves using ammonia as the reductant. The NOx can be temporarily stored in an adsorbant or ammonia can be fed continuously into the exhaust. SCR can achieve NOx reductions in excess of 90%, however, there is concern over the lack of infrastructure for distributing ammonia or a suitable precursor. SCR also raises concerns relating to the possible release of ammonia into the environment.

An alternative approach to reducing emissions is to convert the chemical energy of the fuel into electrical energy using a fuel cell. Fuel cells are not very effective at extracting power from long chain hydrocarbons, but fuel reformers can be used to break long chain hydrocarbons into smaller more reactive molecules such as short chain hydrocarbons, oxygenated hydrocarbons, hydrogen, and carbon monoxide, which are suitable fuels for a fuel cell. For example, U.S. Pat. No. 5,678,647 suggests powering a fuel cell for a vehicle drive system using a conventional fuel processed through a reformer. The reformer and the fuel cell must be heated before they are operative to produce useful power.

U.S. Pat. No. 6,276,473 describes a hybrid power generation system comprising an engine, a fuel reformer, and a fuel cell. The engine is used to provide cold start-power and the engine's exhaust is used to heat the fuel reformer and the fuel cell. When the reformer and fuel cell reach their operating temperatures, the reformer/fuel cell system begins to produce power. The engine can continue to operate after warm-up or be turned off.

U.S. Pat. Appl. Pub. No. 2003/0143445 describes a power generation system comprising an engine, a fuel reformer, a fuel cell, and a NOx trap. The fuel cell can supply reformed fuel to the NOx trap when the engine is operating and to the fuel cell when the engine is not operating.

In spite of progress, there remains a long felt need for environmentally friendly, efficient, and reliable power generation systems for vehicles.

SUMMARY OF THE INVENTION

The following presents a simplified summary in order to provide a basic understanding of some aspects of the invention. This summary is not an extensive overview of the invention. The primary purpose of this summary is to present some concepts of the invention in a simplified form as a prelude to the more detailed description that is presented later.

The invention relates to a power generation system with a continuously operating fuel reformer. Preferably, the fuel reformer is either off, warming up, or operating with an essentially constant fueling rate. Some of the reformed fuel is intermittently used to regenerate a pollution control device, usually an NOx trap, that treats the exhaust of an internal combustion engine. Any reformed fuel not used for other purposes is supplied to a fuel cell. The fuel reformer does not shut down between NOx trap regeneration cycles except when the engine is also shut down.

The invention facilitates the use of a reformer with slow response time to supply the intermittent needs of NOx trap regeneration. The invention also avoids difficulties associated with operating a fuel reformer at a variable rate. Excess power produced by the fuel reformer/fuel cell combination can be used for motive power. Also, the engine can shut down when power demands are met be the fuel cell. In general, it is preferred that the engine shut down rather than idle to reduce pollution and conserve fuel. The fuel cell and/or stored electrical energy can be used to meet vehicle power requirements during circumstances when a conventional power generation system would idle the engine.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
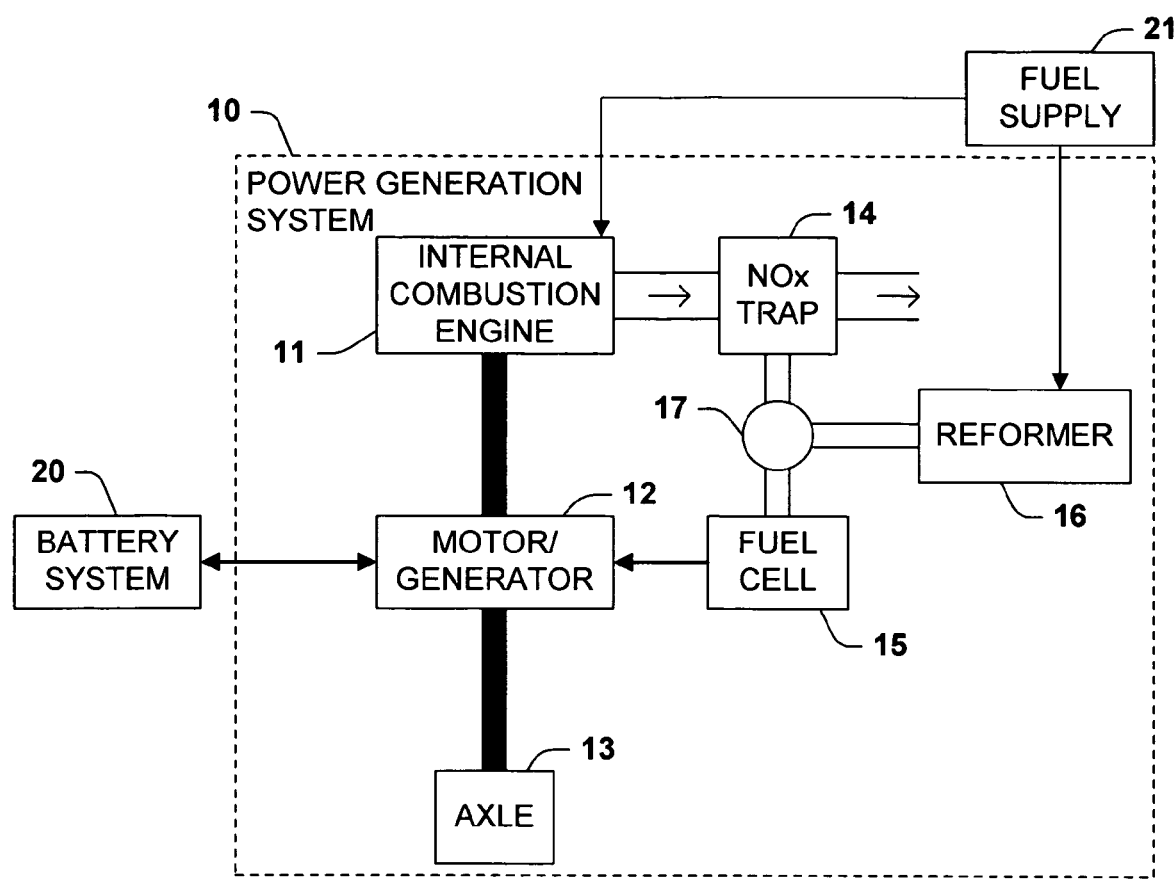
FIG. 1 is a schematic illustration of an exemplary power generation system according to one aspect of the invention.

FIG. 1 is a schematic illustration of an exemplary power generation system 10 according to one aspect of the present invention. The power generation system 10 comprises an internal combustion engine 11 and a motor/generator 12, either of which can drive an axle 13. Exhaust from the internal combustion engine 11 is treated by a NOx trap 14. The NOx trap 14 is intermittently regenerated with reformate from a fuel reformer 16. The reformate is selectively directed to the NOx trap 14 by a valve 17. Reformate not used for regeneration is directed to a fuel cell 15, which produces electric power from the reformate. The electric power can be used to power the motor/generator 12, stored in the battery system 20, or used to power other devices. Both the internal combustion engine 11 and the reformer 16 operate using fossil fuel from a fuel supply 21. The fuel supply 21 and the battery system 20 are illustrated as separate from the power generation system 10, but can be incorporated therein. The fuel supply 21 generally comprises a fuel tank.

The function of valve 17 can be accomplished with any suitable mechanism including, for example, a single valve or a group of valve, dampers, or other devices adapted to selectively divide or divert the flow of reformate between two or more channels.

Figure 2:
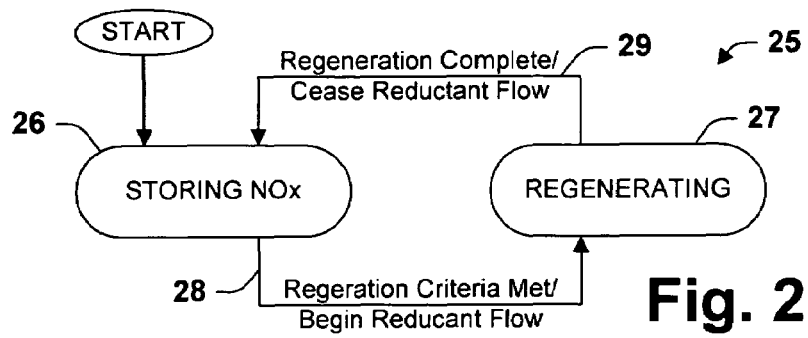
FIG. 2 is a finite state machine diagram illustrating an exemplary method of operating a pollution control device associated with the power generation system of FIG. 1.
Figure 3:
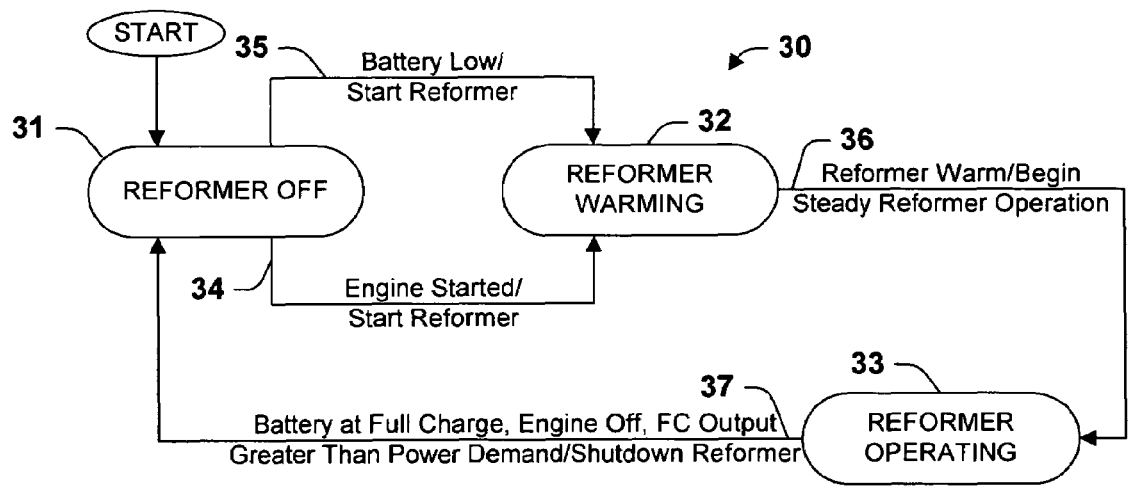
FIG. 3 is a finite state machine diagram illustrating an exemplary method of operating a reformer associated with the power generation system of FIG. 1.
Figure 4:
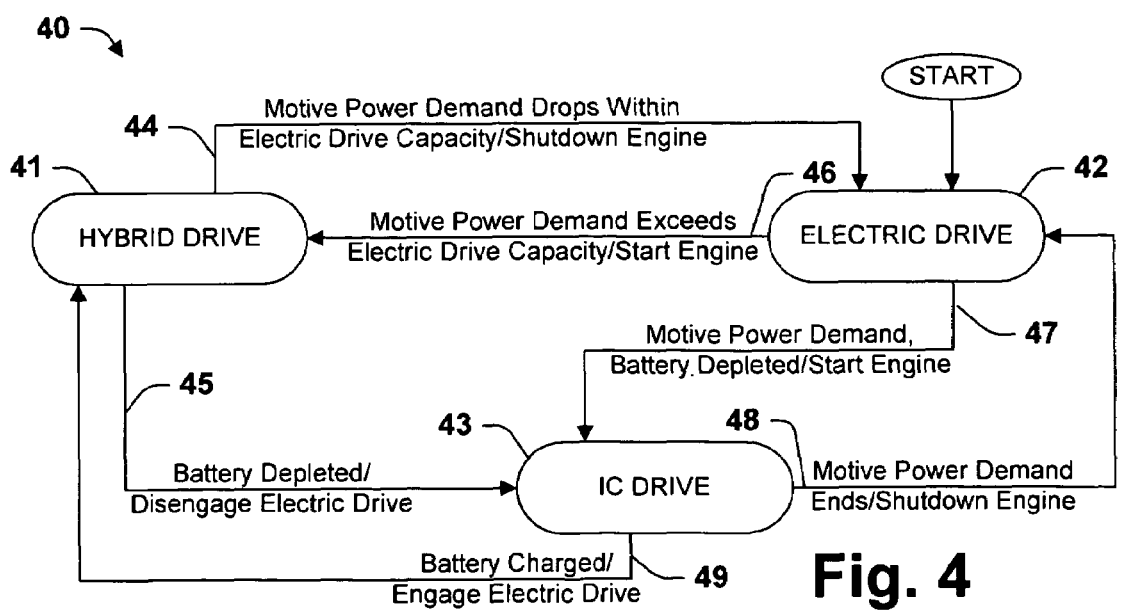
FIG. 4 is a finite state machine diagram illustrating an exemplary method of operating a drive system associated with the power generation system of FIG. 1.

FIGS. 2–4 are finite state machine diagrams illustrating the operation of the exemplary power generation system 10. FIG. 3 illustrates an operating method 30 for the reformer 16. There are three possible states, a reformer off state 31, a reformer warming state 32, and a reformer operating state 33.

The method begins in the reformer off state 31, wherein no fuel is being fed to the reformer 16. Two possible events can take the method 30 out of that state into the reformer warming state 32. One event is event 35: a detection that the charge in the battery system 20 has become low. Optionally, the event 35 can be permitted to occur even when the system 10 is not in use, whereby a minimum battery charge is maintained as long as the fuel supply 21 has fuel. A minimum battery charge can be valuable in that a substantial quantity of electric power maybe desirable to warm up various devices before starting the internal combustion engine 11.

The other event is event 34: a detection that the engine 11 has started. This option is provided as part of a system in which the fuel reformer 16 is operating whenever the engine 11 is operating, whereby reformed fuel is generally available for the NOx trap 14 on demand without concern for the response time of the reformer 16.

In the reformer warming state 32, steps are taken as needed to heat the reformer 16 in preparation for steady state operation. Heating may involve, for example, electrical heating or supplying heat from a burner. Any cooling system associated with the reformer 32 may be disabled and the fuel supply rate may be tailored to facilitate the warm-up process without unduly wasting fuel. The method 30 leaves the reformer warming state upon the reformer warm event 36, whereupon the reformer 16 begins steady operation and the method 30 enters the reformer operating state 33.

In the reformer operating state 33, it is preferred that the reformer 16 operate with substantially constant settings. According to one aspect of the invention, the reformer 10 is either off, in an operating mode that is always the same regardless of demands for reformate, or in transition between those two states. The constant operating mode generally involves a substantially constant fuel supply rate, although other simple operating modes are possible, such as an operating mode that adjusts the flow rate to maintain a constant temperature within the reformer 10. The system 10 is designed to simplify the reformer 10's operation and relieve dependencies on its response time. The system 10 expects that reformate will be generated at a fixed or uncontrolled rate or not at all and that the reformer 16 cannot be cycled off and on quickly.

The reformer operating method 30 can manage warming the fuel cell 15. For example, the reformer warming state 32 could involve warming the fuel cell 15 and the event 36 could require that the fuel cell 15 have reached an operating temperature.

FIG. 2 illustrates an operating method 20 for the NOx trap 14. The method has two states, a storing NOx state 26 and a regenerating state 27. The method begins in the storing NOx state 26. The one event that causes transition from this state to the regenerating state 27, event 28, is detection of appropriate criteria for the beginning of a regeneration cycle, several examples of which are described more fully below. In addition to criteria such as described below, it may also be required that the NOx trap 14 be at an appropriate temperature and that the reformer 16 be in the reformer operating state 33. It is expected that the reformer 16 will generally be in that state when the NOx trap 14 reaches the regeneration condition, because the reformer 16 is started up whenever the engine 11 is running as described above. The operating method 20 leaves the regenerating state 27, ceases regeneration, and returns to the storing NOx state 26 upon detection of the regeneration complete event 29.

FIG. 4 illustrates a method 40 of operating the drive system of the power generation system 10 in response to varying user demands. The method 40 has three states: an electric drive state 42, a hybrid drive state 41, and an IC drive state 43. The method 40 begins in the electric drive state 42. Two events can lead to the engine starting and a departure from that state. One of those events is event 46, which is a motive power demand from an operator exceeding what can be supplied by the motor/generator 12. The amount of power that can be supplied by the motor/generator 12 may vary and can be determined dynamically. A motive power demand could be conveyed by a pedal position. Upon event 46, the method 40 starts the IC engine 11 and transitions to the hybrid drive state 41.

The other event that can cause transition from the electric drive state 42 in this example is a motive power demand at a time the battery system 20 is depleted, event 47. The trigger for event 47 could be either depletion of the battery system 20 while there is a motive power demand or the occurrence of a motive power demand during a time the battery system 47 is depleted. In either case, the IC engine 11 is started and the method 40 enters the IC drive state 43.

In the IC drive state, motive power comes exclusively from the IC engine 11 and any electrical power from the fuel cell 15 is used for purposes other than providing drive, such as to operating accessories or charging the battery system 20.

One of the events that can cause a departure from the IC drive state 43 is a cessation of the motive power demand, event 48. Event 48 involves shutting down the IC engine 11 and transitioning to the electric drive state 42. An optional additional condition precedent to this event is the existence of adequate charge in the battery system 20 or adequate power production from the fuel cell 16, whereby accessories can continue to be operated and the IC engine 11 can be easily restarted. Shutting down the IC engine 11 when motive power demand ceases saves fuel, reduces emissions, and eases emissions abatement. The later point is particularly relevant where the IC engine 11 is a compression ignition engine. Compression ignition engines produce cool exhaust during idle, which can cool emission control devices such as catalytic diesel particulate filters and thereby adversely affect their operation.

The other event that can cause a departure from the IC drive state 43 is the battery charged event 49. The provision of event 49 is a particularly useful feature of the present invention. It is desirable to have the fuel reformer 16 operating continuously whenever the IC engine 11 is operating whereby reformate is available upon demand for regenerating the NOx trap 14 during periods where the IC engine 11 is generating NOx. When the NOx trap 14 is not being regenerated, reformate is still produced. Preferably any reformate not require elsewhere is used to generate electric power in the fuel cell 15. Upon the battery system 20 becoming fully charged, however, this could create an excess of electrical power. The solution offered here is to transition to the hybrid drive state 41, which avoids the undesirable alternatives of shutting down the reformer 16 while the IC engine 11 is producing NOx, of wasting reformate produced by the reformer 16, or of wasting power produced by the fuel cell 15. The event 49 involves engaging the motor/generation 12 and transitioning to the hybrid drive state 41.

In the hybrid drive state 41, motive power is derived from both the internal combustion engine 11 and the motor generator 12. The engine 11 is running and the fuel reformer 16 is either in the reformer warming state 32 or the reformer operating state 33. Generally, the motive power drawn from the electrical motor 12 is the maximum available as long as the method 40 remains in the hybrid drive state 41. If the motive power demand drops to within the capacity of the motor/generator 12, event 44 preferably occurs in which the IC engine is shut down and the method 40 transitions into the electric drive state 42. If the battery system 20 becomes depleted, event 45 occurs and the method 40 disengages the electric drive and transitions into the IC drive state 43. The battery depleted state generally refers to a condition that occurs prior to the battery system 20 becoming completely discharged, whereby some power is always available from the battery system 20.

In an alternative embodiment of the present invention, the power generation system does not have an electric motor 12 or a hybrid drive state 41, but is configured for a hybrid fueling state. In the hybrid fueling state, reformate is used as a fuel or supplemental fuel for the IC engine 11. The hybrid fueling state is used to draw off reformate from the fuel cell 15 to avoid excess electrical power generation as described in connection with the event 49. The hybrid fueling state is preferably engaged before the battery system 20 becomes completely charged, whereby the battery system 20 can continue to receive power from the fuel cell 15 during periods where the IC engine 11 has a low demand for fuel.

The battery system 20 is a natural choice for an energy storage device in a system having a fuel cell, however, other energy storage devices can be used in addition to, or instead of, the battery system 20 in the power generation system 10. Other types of energy storage devices include, without limitation, fluid power accumulators, springs, and fly wheels.

The motor/generator 12 is configured to either drive the axle 13 using power from the battery system 20 or the fuel cell 15, or to draw power from the axle 13 for storage in the battery system 20 or use elsewhere. A motor/generator is an electric motor that can be run in reverse to act as a generator. Although not required, to allow for regenerative braking, the motor/generator 12 is provided in the system 10 rather than a simple electric motor.

The internal combustion engine 11 can be any type of internal combustion engine. A suitable engine can be, for example, a compression ignition engine or a spark ignition engine. The engine 11 can be designed for any particular type or types of hydrocarbon or oxygenated hydrocarbon fuel, including for example diesel, gasoline, natural gas, or methanol.

The fuel cell 15 can comprise any suitable type of fuel cell. The fuel cell type can be, for example, a solid oxide fuel cell (SOFC), a molten carbonate fuel cell (MCFC), or a phosphoric acid fuel cell (PAFC). The term fuel cell as used herein is inclusive of devices comprising multiple individual fuel cells connected in parallel or in series. The fuel cell can have any suitable structure. Suitable structures include, for example, tubular and planar structures.

A fuel cell as used in the present context can produce a significant amount of power during steady operation. The phrases a "significant amount of power during steady operation" and "significant useful power" can be used herein to distinguish fuel cells that serve only as sensors, providing little power beyond what is required for their own operation.

An SOFC fuel cell is preferred. SOFCs are generally characterized in terms of their electrolytes. Any suitable electrolyte can be used. Examples of electrolytes include stabilized zirconium, such as $Y_2O_3$ stabilized $ZrO_2$; ceria-based oxides, chlorides, and fluorides, such as gadolinium doped $CeO_2$; alumina electrolytes, such as chloride, fluoride, or sodium doped alumina; lanthanum electrolytes, such as strontium doped lanthanum maganite and lanthanum gallate; and doped bismuth oxides, such as bismuth vanadium cobalt oxide.

The anodes and cathodes can be of any suitable type. Suitable electrodes have low thermal mismatch with the electrolyte material. The cathode is electrically conductive, reacts with oxygen to form oxygen ions, and allows the ions to pass through to the electrolyte. Depending on the electrolyte, a suitable cathode material could be a porous lanthanum strontium maganite, a lanthanum strontium ferrite or lanthanum strontium cobalt ferrite. The anode is also electrically conductive and allows the passage of oxygen ions. A suitable anode material could be nickel. These exemplary anode and cathode material are commonly mixed with the electrolyte material, as this generally gives better performance.

A preferred fuel cell is an intermediate temperature solid oxide fuel cell. An intermediate temperature solid oxide fuel cell is a fuel cell operative at a temperature within the range from about 250 to about 600° C., more preferably within the range from about 400 to about 550° C. Being operative at a temperature means that the fuel cell can operate at that temperature with a substantial efficiency in terms of energy production from at least CO, over a substantial period.

The reformer 16 can be any suitable type of reformer. Reformers can be characterized in terms of the amount and types of oxidant sources supplied and the steps taken to promote reaction. The oxidant source is generally either oxygen or water. Oxygen can be supplied from air, from lean exhaust, or in a relatively pure form, as in oxygen produced from hydrogen peroxide or water. Partial oxidation by oxygen is exothermic and partial oxidation by water in endothermic. A balance between the two can be selected to achieve a desired degree of heat release, heat consumption, or an energy neutral reaction in the reformer 16. The reformer 16 can promote reaction with one or more of heat, a catalyst, and plasma. Plasma is typically generated with an electric arc. Some specific example of options for the reformer 16 include steam reformers, autothermal reformers, partial oxidation reformers, and plasma reformers. Reforming breaks heavier hydrocarbons to produce reformate, which can include light hydrocarbons and oxygenated hydrocarbons, CO, and hydrogen.

The NOx trap 14 comprises at least an NOx adsorption bed and preferably also a catalyst effective for reducing NOx in a reducing environment. In some cases, the catalyst contributes to the adsorbant function and is necessarily provided in the adsorbant bed. In other cases, the catalyst is optional and can be provided in a separate bed downstream of the adsorption bed. The adsorption bed comprises an effective amount of an adsorbent for NOx in an oxidizing (lean) environment. $NO_x$ includes, without limitation, NO, $NO_2$, $N_2O$, and $N_2O_2$. The NOx trap 14 desorbs and/or reduces NOx in a reducing environment, provided that the lean NOx trap is in an appropriate temperature range.

The adsorption bed can comprise any suitable adsorbant material. Examples of adsorbant materials include molecular sieves, such as zeolites, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phoshates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. Preferred zeolites generally include rare earth zeolites and Thomsonite. Rare earth zeolites are zeolites that have been extensively (i.e., at least about 50%) or fully ion exchanged with a rare earth metal, such as lanthanum.

The adsorbant is typically combined with a binder and either formed into a self-supporting structure or applied as a coating over an inert substrate. A binder can be, for example, a clay, a silicate, or a cement. Portland cement can be used to bind molecular sieve crystals. Generally, the adsorbant is most effective when a minimum of binder is used. Preferably, the adsorbant bed contains from about 3 to about 20% binder, more preferably from about 3 to about 12%, most preferably from about 3 to about 8%.

Devices according to the present invention are generally adapted for use in vehicle exhaust systems. Vehicle exhaust systems create restriction on weight, dimensions, and durability. For example, an adsorption bed for a vehicle exhaust system must be reasonably resistant to degradation under the vibrations encountered during vehicle operation.

Beds that have an adsorbant function tend to be large in comparison to beds that have only a catalytic function. To limit the total mass, the adsorbant bed preferably comprises a high loading of adsorbant per unit bed mass. Preferably, an adsorbant bed comprises at least about 40% adsorbant by weight. The weight of an adsorbant bed includes any inert substrate and any binders, but does not include any housing. Preferably an adsorbant bed comprises at least about 20% adsorbant by volume.

Adsorbant beds are optionally provided with mechanisms for heating and/or cooling. For example, a bed can be permeated with heat-exchange passages in fluid isolation from the passages provided for adsorbed and desorbed gases. A hot or cold fluid is circulated through the heat-exchange passages to heat or cool the adsorber. A cooling fluid could be, for example, engine coolant or ambient air. A heating fluid could be, for example, hot exhaust or a fluid that draws heat from hot exhaust or a heat-producing device such as an ammonia synthesis reactor, a fuel reformer, or an adsorber. Another option is electrical resistance heating. Where a bed includes a metal substrate, the metal substrate can be used as an electrical resistance heater. A bed can also be permeated by wires for electrical resistance heating.

An adsorbant bed can have any suitable structure. Examples of suitable structures may include monoliths, packed beds, and layered screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

Preferably an NOx adsorption bed has a large capacity for adsorbing a NOx species at a typical exhaust temperature and NOx partial pressure. Preferably, the adsorbant can adsorb at least about 3% of a NOx species by weight adsorbant at a typical exhaust temperature and 1 torr partial pressure of the NOx species, more preferably at least about 5% by weight adsorbant, and still more preferably at least about 7% by weight adsorbant. The weight of adsorbant does not include the weight of any binders or inert substrates. Depending on the application, a typical exhaust temperature may be 350° C.

A catalyst for the NOx trap 14 can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Effective operating temperatures are generally in the range from about 200 to about 450° C.

Any suitable strategy can be used to control the regeneration of the NOx trap 14. A control scheme can involve determination of one or more of the following parameters: the time at which a regeneration cycle is initiated, the duration of a regeneration cycle, and the reductant concentration during a regeneration cycle.

One method of determining when to initiate a regeneration cycle involves measuring the NOx concentration downstream of the NOx trap 14. When this concentration exceeds a target level, regeneration begins. Another method is to estimate or measure the amount of NOx produced by the engine 11 and from that figure to estimate the amount of NOx stored in the NOx trap 14, initiating regeneration when the trap has reached some critical loading.

During regeneration, some $NH_3$ can desorb from the NOx trap 14. Optionally an SCR reactor can be provided to downstream of or combined with the NOx trap 14 to react a further portion of NOx with this ammonia. The NOx can be NOx that is never adsorbed by the NOx trap 14 or NOx that escapes the NOx trap 14 during regeneration.

Optionally, the SCR reactor can be adapted to store ammonia. Regeneration can be initiated based on the concentration of stored ammonia falling to a critical value. Initiating regeneration while there is still some ammonia stored in the SCR reactor can reduce NOx breakthrough. This approach involves maintaining an estimated of the amount of ammonia in the SCR reactor. Maintaining this estimate generally involves measuring ammonia and NOx concentrations between the NOx trap 14 and the SCR reactor.

Another control strategy is simply focused on increasing ammonia production during regeneration of the NOx trap 14. When an NOx trap is saturated with NOx, relatively little ammonia production is observed. Over the course of a regeneration cycle for a saturated NOx trap, as the amount of NOx in the trap decreases, ammonia production increases. By starting the regeneration cycle prior to saturation, the production of ammonia in favor of $N_2$ can be increased. Accordingly, regeneration can begin when the NOx trap 14 reaches a certain level of saturation, which is preferably in the range from about 5 to about 50% saturation, more preferably from about 10 to about 30% saturation. The degree of saturation can be estimated from measurements or a model-based estimate of the amount of NOx in the exhaust and a model for the NOx trap 14's adsorption efficiency and capacity. Preferably, the control scheme is effective whereby the fraction of adsorbed NOx converted to ammonia is at least about 20%, more preferably at least about 40%.

In another embodiment, regeneration is timed to control a ratio between total ammonia and NOx released by the NOx trap 14. The ratio may be targeted at one to one (a stoichiometric ratio), whereby the ammonia produced by the NOx trap 14 is just enough to reduce the NOx passing through to the SCR reactor. Preferably, however, the ratio is slightly less, whereby ammonia slip can be avoided. A lesser amount of ammonia is preferably from about 60 to about 95% of a stoichiometric amount. The amount may also be reduced by an efficiency factor accounting for the fact that, depending on the structure, catalyst loading, and temperature of the SCR reactor, a significant fraction of the NOx supplied to the SCR reactor may not react with ammonia even when adequate ammonia is available. Feedback control can be used to obtain the target ratio. In particular, the time between regeneration cycles can be shortened to increase ammonia production and lengthened to decrease ammonia production, with the ultimate goal of creating a balance between ammonia production and NOx emission from the NOx trap 14.

A control strategy can also be used to determine when to terminate a regeneration cycle, as opposed to the alternative of terminating the regeneration cycle after a fixed or predetermined period of time. Typically, the amount of NOx in the NOx trap 14 can be determined from vehicle operating conditions and a few measurements. The amount of reductant required to regenerate the NOx trap 14 can then be calculated. Nevertheless, it can be advantageous to use feedback control to determine when to conclude a regeneration cycle. In a preferred embodiment, a regeneration cycle is terminated according to measurements of the ammonia concentration downstream of the NOx trap 14.

As a regeneration cycle progresses, the ammonia concentration downstream of an NOx trap 14 first increases, then decreases. The regeneration cycle can be terminated at any recognizable point in the ammonia concentration curve. Most preferably, the regeneration cycle is ended upon the ammonia concentration falling below a target value following a peak. As the ammonia concentration is falling, progressively more unused reductant is slipping through the NOx trap 14. Therefore, the target value is a design choice reflecting a trade-off between maximizing ammonia production and minimizing reductant slip.

Another control strategy relates to the rate at which reductant is injected. Reductant injection rate can be targeted to a particular equivalence ratio. An equivalence ratio is based on the fuel-air mixture as supplied to the engine 11, with a stoichiometric ratio having an equivalence ratio of one. Additional reductant injected into the exhaust downstream of the engine 11 is figured into the equivalence ratio just as if it were supplied to the engine 11.

In one embodiment, the reductant injection rate is maximized subject to a limit on reductant breakthrough. Generally, increasing the equivalence ratio increases the ammonia production rate and minimizes the regeneration time. Where the reductant is injected into the exhaust, reducing the regeneration time reduces the fuel penalty. During regeneration, reductant must be supplied to consume free oxygen in the exhaust. This reductant is in excess of the reductant used to reduce NOx. The total amount of oxygen to consume depends on the length of the regeneration cycle. If the regeneration cycle is shorter, the molar flow of oxygen that must be reduced is less.

In a preferred embodiment, the reductant breakthrough rate is determined by an oxidizable species sensor downstream of the NOx trap 14 or the SCR reactor, where one is provided. All oxidizable species can be considered reductant. For purposes of control, the breakthrough rate is preferably expressed as a fraction of the injection rate in excess of the injection rate required to consume free oxygen. For example, if doubling the excess injection rate over the amount required to consume free oxygen only doubles the breakthrough rate, the fractional conversion of reductant has not decreased at all. In one embodiment, the reductant injection rate is controlled to give from about 50 to about 95% conversion of reductant in excess of the amount required to consume free oxygen, in another embodiment from about 70 to about 90% conversion.

Another method of reducing the fuel penalty is to employ two or more NOx traps in parallel. One advantage of a dual adsorber system is that an NOx trap requiring regeneration can be taken offline from the exhaust stream and reformate does not need to be wasted consuming free oxygen in the exhaust during regeneration. Another advantage is that reformate does not need to be diluted with the exhaust. This increases the concentration of the reducing agent and thereby the efficiency with which it reacts. A further advantage is that the residence time of the reducing agent in the NOx trap 14 can be increased. The residence time can be increased both because the residence time is not limited by the exhaust flow rate and because more time can be taken to regenerate the NOx trap 14. A longer residence time allows for a higher conversion efficiency for a given amount of catalyst.

Regeneration of dual NOx traps 14 can be controlled as described for the single NOx trap 14 in the power generation system 10, however, some of the considerations are different. One significant difference is that it may be desirable to control the regeneration to provide a relatively steady supply of ammonia to a downstream SCR reactor, whereby the ammonia flow rate can approximately matches the rate at which NOx escapes the trap not undergoing regeneration. In this configuration, exhausts from the two or more NOx traps unite into a single stream feeding an SCR reactor.

An SCR reactor is a catalyst bed comprising an effective amount of an ammonia SCR catalyst. An ammonia SCR catalyst is one that effectively catalyzes a reaction such as:

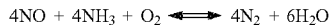

in lean exhaust. Catalysts for this reaction will also reduce other species of NOx. $NO_x$ includes, without limitation, NO, $NO_2$, $N_2O$, and $N_2O_2$. Examples of SCR catalysts include oxides of metals such as Cu, Zn, V, Cr, Al, Ti, Mn, Co, Fe, Ni, Pd, Pt, Rh, Rd, Mo, and W. Other examples of ammonia SCR catalyst include zeolites, such as ZSM-5 or ZSM-11 substituted with metal ions such as cations of Cu, Co, Ag, Zn, or Pt, and activated carbon. A preferred catalyst is a combination of $TiO_2$, with one or more of $WO_3$, $V_2O_5$, and $MoO_3$, for example about 70 to about 95% by weight $TiO_2$, about 5 to about 20% by weight $WO_3$ and/or $MoO_3$, and 0 to about 5% by weight $V_2O_3$. Catalysts of this type are commercially available and can be tailored by the manufacturer for specific applications. The typical temperature range in which these catalysts are effective is from about 230 to about 500° C. If the temperature is too high, the ammonia decomposes before reducing NOx The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The invention claimed is:

1. A power generation system, comprising:
an internal combustion engine configured to drive an axle and operational to produce exhaust;
a NOx trap operational to extract NOx from the exhaust;
a fuel reformer operational to produce reformate; and
a fuel cell configured to receive at least a portion of the reformate and use it to generate electrical power;
wherein the system is configured to regenerate the NOx trap using a portion of the reformate; and
the system is configured for the fuel reformer to operate in such a way that NOx trap regeneration can always commence on demand whenever the power generation system is operating steadily after warm-up without the need to first change operation of the reformer in response to the demand.

2. The power generation system of claim 1, the system is not configured to supply the reformate to the engine.

3. The power generation system of claim 1, wherein the system is configured to by default supply the reformate to the fuel cell, diverting a portion of the reformate from the fuel cell to the NOx trap as needed for regeneration and the diversions occur without significantly modifying operational settings for the fuel reformer.

4. The power generation system of claim 1, wherein the system is the fuel reformer is configured to operate according to settings that are not designed to change significantly between periods of regenerating the NOx trap and periods wherein the NOx trap is not being regenerated.

5. The power generation system of claim 1, wherein the system is configured to startup and shutdown the fuel reformer, but to otherwise operate the fuel reformer with a fueling rate that is essentially constant.

6. The power generation system of claim 1, further comprising an electric motor configured to drive the axle.

7. The power generation system of claim 6, further comprising a battery storage system and-wherein the power generation system is configured to deliver power to the electric motor in a manner that limits the accumulation of energy in the battery storage system.

8. The power generation system of claim 6, wherein the system is configured to automatically shut down the internal combustion engine while continuing to drive the axle during periods when power demands can be met without the engine.

9. A vehicle comprising the power generation system of claim 1.

10. The vehicle of claim 9, further comprising an accelerator pedal, wherein the system is configured to automatically shutdown the engine when an operator removes his foot from the accelerator pedal.

11. A method of operating a power generation system comprising an internal combustion engine, a fuel reformer, a NOx trap, and a fuel cell, comprising:
operating the fuel reformer at least whenever the engine is running, except optionally while the engine is warming up;
using the reformed fuel to power the fuel cell and thereby produce a significant amount of power;
intermittently regenerating the NOx trap by redirecting a portion of the reformed fuel from the fuel cell to the NOx trap;
wherein throughout periods between startup and shutdown of the fuel reformer the fuel reformer is operated with an essentially constant fueling rate.

12. The method of claim 11, wherein the engine is shutdown rather than idled.

13. The method of claim 11, wherein the reformer fueling rate does not vary substantially as the NOx trap is intermittently regenerated.

14. The method of claim 11, wherein the fuel reformer is operated at an essentially constant fueling rate whenever the fuel reformer is warmed up and operating.

15. The method of claim 11, wherein the power generation system further comprises an electric drive and the method further comprises selectively delivering power to the electric drive to avoid accumulation of excess electrical energy during prolong periods of fuel reformer and fuel cell operation.

16. The method of claim 11, wherein the power generation system further comprises a battery system and the fuel reformer is not shutdown unless the engine is off and the battery system has at least a determinate level of charge.

17. The method of claim 11, wherein the power generation system further comprises an electric drive and a battery system and the method comprises selectively engaging the electric drive in response to a charge level in the battery system.

18. The method of claim 17, wherein the electric drive is engaged upon the battery system exceeding a determinate charge level.

19. The method of claim 17, wherein the electric drive is disengaged when the battery system falls below a determinate charge level.

20. A method of operating a vehicle having a power generation system, comprising operating the power generation system according to the method of claim 11.

21. The method of claim 20, wherein the fuel reformer and fuel cell provide sufficient energy for cabin heating and other electrical demands of the vehicle while the engine is stopped.

22. The method of claim 20, wherein the fuel reformer is operated at an essentially constant fueling rate whenever the fuel reformer is warmed up and being supplied with fuel.

23. A method of operating a fuel reformer mounted on a vehicle having an internal combustion engine that produces exhaust, a pollution control device that treats the exhaust, and a fuel cell, comprising:
   operating the fuel reformer to produce reformate;
   providing the reformate to the pollution control device as needed; and
   sending reformate in excess of other needs to the fuel cell;
   wherein the fuel reformer is operated in such a way that NOx trap regeneration can commence on demand without the need to first change operation of the reformer in response to the demand as long as the engine is not shut down.

24. The method of claim 23, wherein the fuel reformer operates at an essentially constant rate.

25. The method of claim 23, further comprising automatically starting the fuel reformer to provide reformate to the fuel cell to produce power to charge a battery system whenever fuel is available and the battery system charge falls below a determinate level.

26. The method of claim 23, wherein none of the reformate is supplied to the engine.

* * * * *